(12) United States Patent
Mortun et al.

(10) Patent No.: US 10,931,066 B2
(45) Date of Patent: Feb. 23, 2021

(54) SYSTEM AND METHOD FOR SENSING TEMPERATURE OF A RECEPTACLE

(71) Applicant: Hubbell Incorporated, Shelton, CT (US)

(72) Inventors: Sorin Mortun, Irvington, NY (US); Matthew Samojeden, Rye, NY (US)

(73) Assignee: Hubbell Incorporated, Shelton, CT (US)

( * ) Notice: Subject to any disclaimer, the term of this patent is extended or adjusted under 35 U.S.C. 154(b) by 62 days.

(21) Appl. No.: 16/143,657

(22) Filed: Sep. 27, 2018

(65) Prior Publication Data
US 2019/0097364 A1     Mar. 28, 2019

Related U.S. Application Data

(60) Provisional application No. 62/564,623, filed on Sep. 28, 2017.

(51) Int. Cl.
| | |
|---|---|
| *H01R 13/66* | (2006.01) |
| *H01R 13/512* | (2006.01) |
| *G01K 1/14* | (2021.01) |
| *H01R 25/00* | (2006.01) |
| *H01R 24/78* | (2011.01) |

(52) U.S. Cl.
CPC ........... *H01R 13/6683* (2013.01); *G01K 1/14* (2013.01); *H01R 13/512* (2013.01); *H01R 25/006* (2013.01); *H01R 24/78* (2013.01)

(58) Field of Classification Search
CPC ............. H01R 13/6683; H01R 13/512; H01R 25/006; H01R 24/78; H01R 13/715; G01K 1/14

USPC ........................... 439/107, 488, 490, 620.21
See application file for complete search history.

(56) References Cited

U.S. PATENT DOCUMENTS

| | | | |
|---|---|---|---|
| 6,398,594 B1* | 6/2002 | Bonilla ................ | H01R 13/506 439/107 |
| 7,790,982 B2* | 9/2010 | Weeks ............... | H01R 13/4534 174/50 |
| 2002/0097546 A1* | 7/2002 | Weinberger .......... | H01R 13/713 361/103 |
| 2007/0046418 A1* | 3/2007 | Shea ..................... | H01H 37/08 337/401 |

(Continued)

FOREIGN PATENT DOCUMENTS

CN            105844869       8/2016

OTHER PUBLICATIONS

PCT/US2018/053018 International Search Report and Written Opinion dated Dec. 4, 2018 (17 pages).

*Primary Examiner* — Travis S Chambers
(74) *Attorney, Agent, or Firm* — Michael Best & Friedrich, LLP

(57) ABSTRACT

An electrical receptacle including an outlet, a load terminal, a line terminal, a sensor, and a controller. The outlet is configured to electrically connect to an external load. The load terminal is electrically connected to the outlet and the line terminal is electrically connected to a line and configured to receive line power. The sensor is configured to sense a temperature of the receptacle. The controller has an electronic processor and a memory. The controller is configured to receive the temperature of the receptacle, compare the temperature to a threshold, and output an indication in response to the temperature crossing the threshold.

9 Claims, 6 Drawing Sheets

(56) References Cited

U.S. PATENT DOCUMENTS

| | | | |
|---|---|---|---|
| 2009/0201145 A1* | 8/2009 | Vasquez | H01R 13/652 340/539.1 |
| 2010/0277325 A1* | 11/2010 | Kopelman | H01H 37/74 340/595 |
| 2013/0141822 A1* | 6/2013 | Weeks | H01R 13/4534 361/42 |
| 2015/0171567 A1* | 6/2015 | Kawamoto | H01R 13/665 439/620.21 |

* cited by examiner

SYSTEM AND METHOD FOR SENSING TEMPERATURE OF A RECEPTACLE

RELATED APPLICATIONS

This application claims the benefit to U.S. Provisional Patent Application No. 62/564,623, filed on Sep. 28, 2017, the entire contents of which are incorporated herein by reference.

FIELD

Embodiments relate to electrical receptacles.

SUMMARY

Electrical receptacles, such as ground fault circuit interrupters (GFCI) receptacles, are configured to provide electrical power to an external load via an outlet.

Embodiments provide an electrical receptacle including an outlet, a load terminal, a line terminal, a sensor, and a controller. The outlet is configured to electrically connect to an external load. The load terminal is electrically connected to the outlet and the line terminal is electrically connected to a line and configured to receive line power. The sensor is configured to sense a temperature of the receptacle. The controller has an electronic processor and a memory. The controller is configured to receive the temperature of the receptacle, compare the temperature to a threshold, and output an indication in response to the temperature crossing the threshold.

Other embodiments provide a method of monitoring an electrical receptacle. The method includes sensing, via a sensor, a temperature of the receptacle, and comparing, via a controller, the temperature of the receptacle to a threshold. The method further includes outputting, from the controller, an indication in response to the temperature of the receptacle crossing the threshold Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
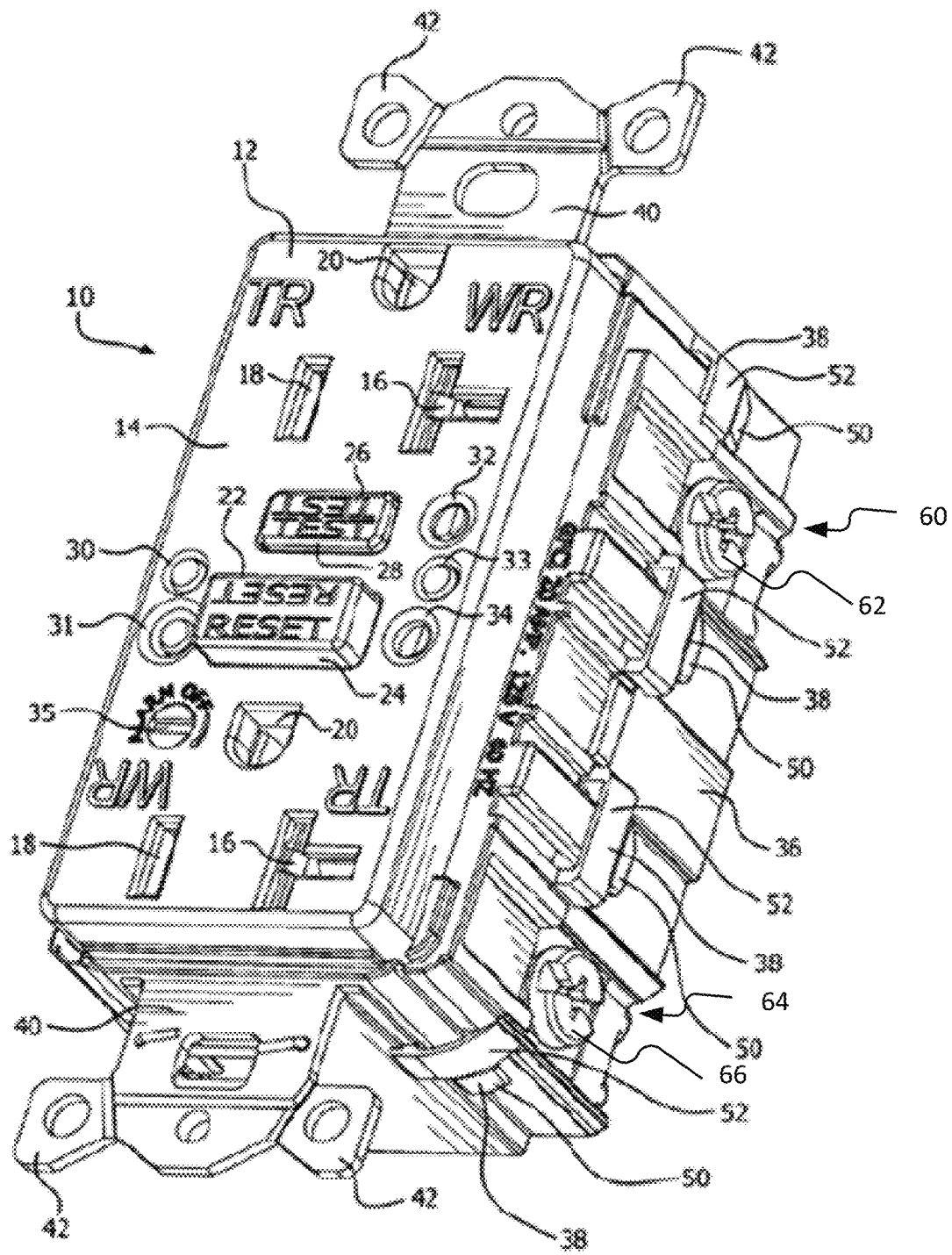
FIG. 1 is a perspective view of an electrical receptacle according to some embodiments.

FIG. 1 illustrates a perspective view of a receptacle 10 according to one embodiment of the invention. The receptacle 10 is configured to provide electric power to an external electrical load/device (not shown) when electrically coupled to the external load (for example, the external device 230 of FIG. 5). In some embodiments, the receptacle 10 is a ground fault circuit interrupter (GFCI) device. In some embodiments, the receptacle 10 is configured to provide 120 VAC and/or 220 VAC. In some embodiments, the receptacle 10 may include a standard alternating current (AC) receptacle and/or a Universal Serial Bus (USB) outlet, or other direct current (DC) outlet.

The receptacle 10 includes a front cover, or receptacle face, 12 having a duplex outlet face 14 with a phase opening 16, a neutral opening 18, and a ground opening 20. The face 14 further has opening 22, accommodating a RESET button 24, an adjacent opening 26, accommodating a TEST button 28, and six respective circular openings 30-35. In some embodiments, openings 30 and 33 accommodate two respective indicators, such as but not limited to, various colored light-emitting diodes (LEDs) (not shown). In some embodiments, openings 32 and 34 accommodate respective bright LEDs used, for example, as a nightlight or, as explained in more detail below, an indication of a failure of the receptacle 10. In some embodiments, opening 31 accommodates a photoconductive photocell used, for example, to control the nightlight LEDs. In some embodiments, opening 35 provides access to a set screw for adjusting a photocell device or a buzzer (e.g., buzzer 605 described in more detail below) in accordance with this, as well as other, embodiments. In some embodiments, the front cover 12 may only include outlet openings.

In the illustrated embodiment, the receptacle 10 further includes a rear cover 36 secured to the front cover 12 by eight fasteners 38 (four fasteners 38 are shown in FIG. 1, while the other four fasteners 38 are obstructed from view). In some embodiments, the fasteners 38 include a barbed post 50 on the front cover 12 and a corresponding resilient hoop 52 on the rear cover 36, similar to that which is described in detail in U.S. Pat. No. 6,398,594, the entire contents of which are incorporated herein by reference for all that is taught. A ground yoke/bridge assembly 40 includes standard mounting ears 42 protruding from the ends of the receptacle 10.

The rear cover 36 includes line screw receptacle 60 configured to receive a line screw 62 and a neutral screw receptacle 64 configured to receive a neutral screw 66. In some embodiments, the rear cover 36 further includes a ground screw receptacle and a ground screw. In operation, a line, or hot line, may be electrically coupled to the receptacle 10 via the line screw 62 while a neutral line may be electrically coupled to the receptacle 10 via the neutral screw 66. Additionally, the receptacle 10 may be electrically grounded via the ground screw. In some embodiments, the rear cover 36 may include additional line screw receptacles, line screws, neutral screw receptacles, and neutral screws.

Figure 2:
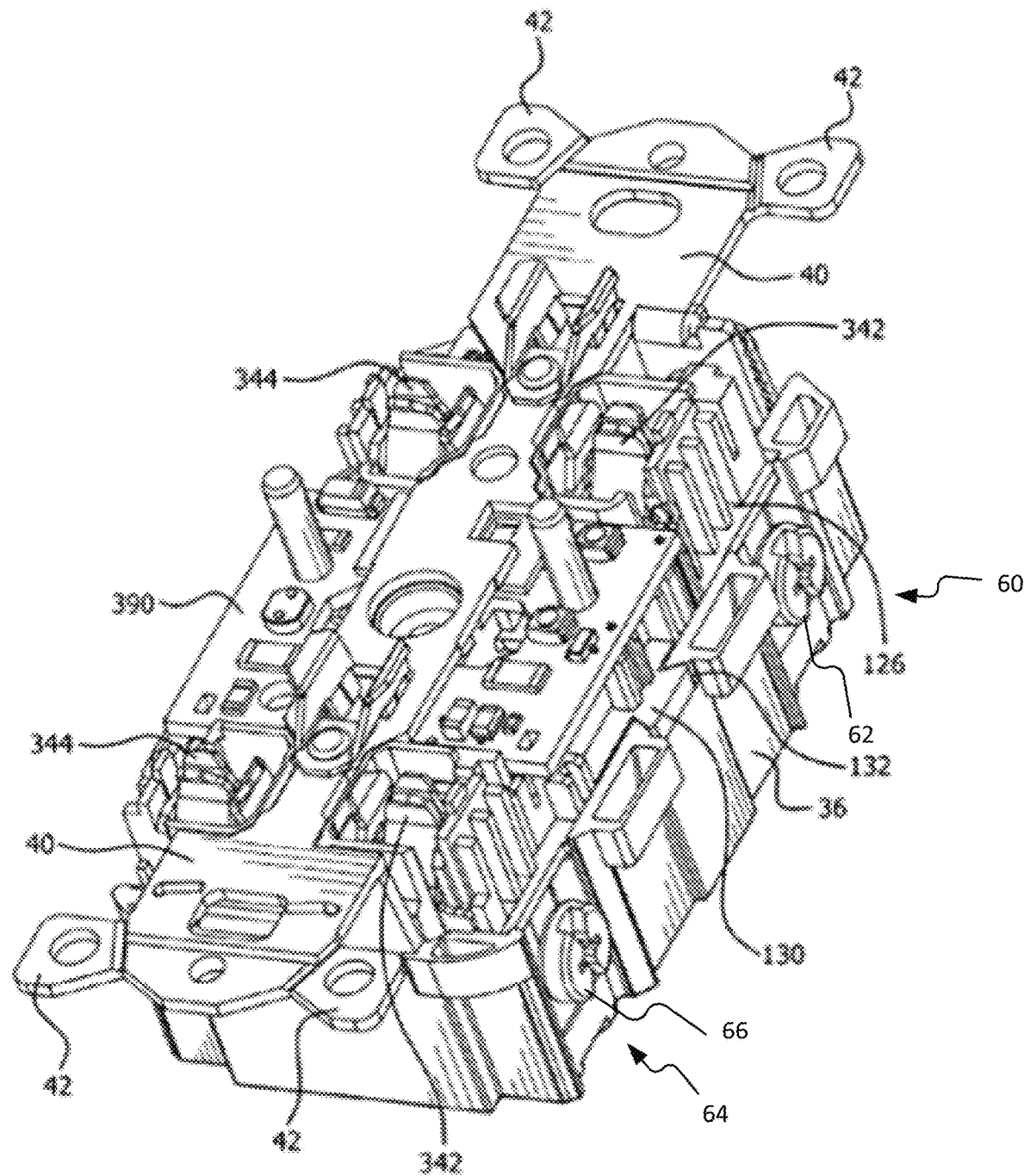
FIG. 2 is a partially exposed view of the electrical receptacle of FIG. 1 according to some embodiments.

FIG. 2 illustrates a perspective view of the receptacle 10 with the front cover 12 removed to expose manifold 126.

Manifold 126 provides support for a printed circuit board 390 and the yoke/bridge assembly 40. According to one embodiment, manifold 126 includes four dovetail interconnects 130 that mate with corresponding cavities 132 along an upper edge of the rear cover 36. One dovetail-cavity pair is provided on each of the four sides of manifold 126 and rear cover 36, respectively.

Figure 3:
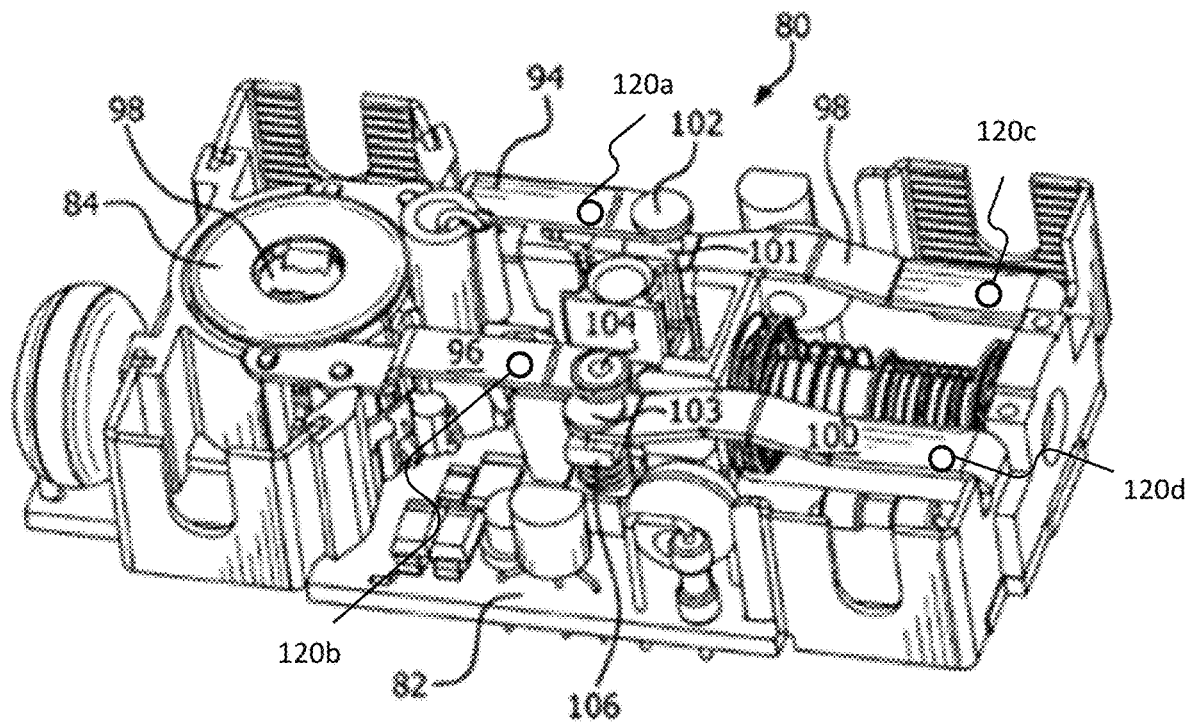
FIG. 3 is a partially exposed view of the electrical receptacle of FIG. 1 according to some embodiments.
Figure 4:
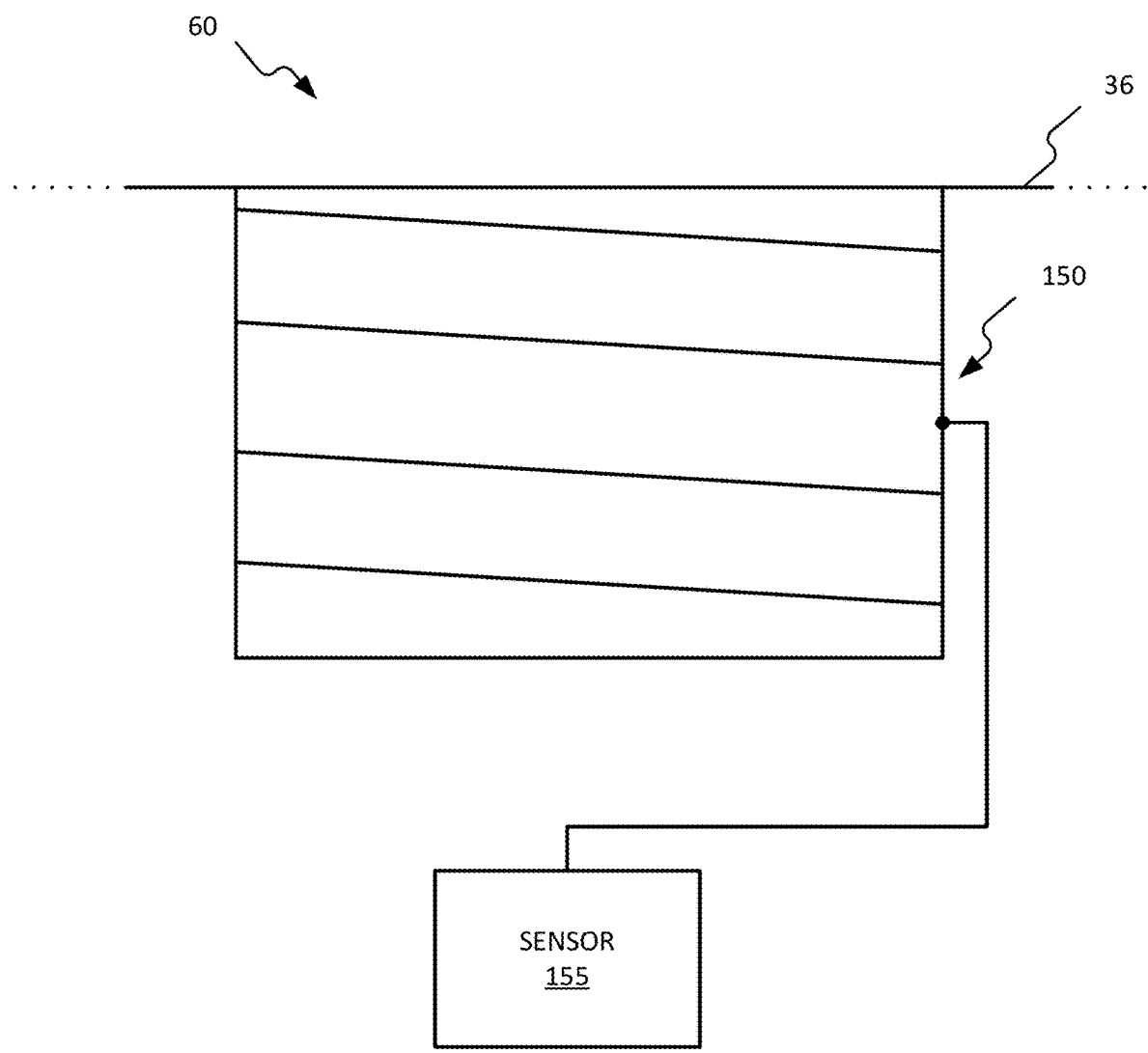
FIG. 4 is a cutaway view of a screw receptacle of the electrical receptacle of FIG. 1 according to some embodiments.

FIG. 3 is a side elevation view of a core assembly 80 according to some embodiments. Core assembly 80 includes a circuit board, such as a printed-circuit board (PCB), 82 that supports most of the working components of the receptacle 10, including the control system 200 (FIG. 4). Line contact arms 94, 96 pass through transformers 425, 430 with an insulating separator 97 there between. Line contact arms 94, 96 are cantilevered, their respective distal ends carrying phase and neutral line contacts 102, 104. Load contact arms 98, 100 are also cantilevered with their respective distal ends carrying phase and neutral load contacts 101, 103. The resiliency of the cantilevered contact arms biases the line contacts 102, 104 and load contacts 101, 103 away from each other. Load contact arms 98, 100 rest on a movable contact carriage 106, made of insulating (preferably thermoplastic) material.

FIG. 4 illustrates a cutaway view of the line screw receptacle 60 according to some embodiments. In some embodiments, the neutral screw receptacle 64 and the ground screw receptacle are similar to the line screw receptacle 60. In the illustrated embodiment, line screw receptacle 60 includes a sensor probe 150. Sensor probe 150 may be configured to receive a sensor 155. The sensor 155 is configured to sensor one or more characteristics of the receptacle 10. For example, in some embodiments, the sensor 155 is a temperature sensor, such as but not limited to, a thermocouple, a resistive temperature device (RTD), a thermistor (for example, a negative temperature coefficient (NTC) thermistor), and a semiconductor-based temperature sensor. The sensor 155 is configured to sense a temperature of the receptacle 60 and/or the screw 62 located within the receptacle 60.

In some embodiments, the receptacle 10 includes additional sensors. For example, in some embodiments the core assembly 80 (FIGS. 1-3) further includes one or more additional sensors 120. Sensors 120 are configured to sense one or more characteristics of the receptacle 10. For example, in some embodiments, sensors 120 are temperature sensors configured to sense the temperature of the receptacle 10 at various locations. For example, in the illustrated embodiment, sensor 120a may be configured to sense a temperature of line contact arm 94, sensor 120b may be configured to sense a temperature of line contact arm 94, sensor 120c may be configured to sense a temperature of load contact arm 98, and sensor 120d may be configured to sense a temperature of load contact arm 100.

Figure 5:
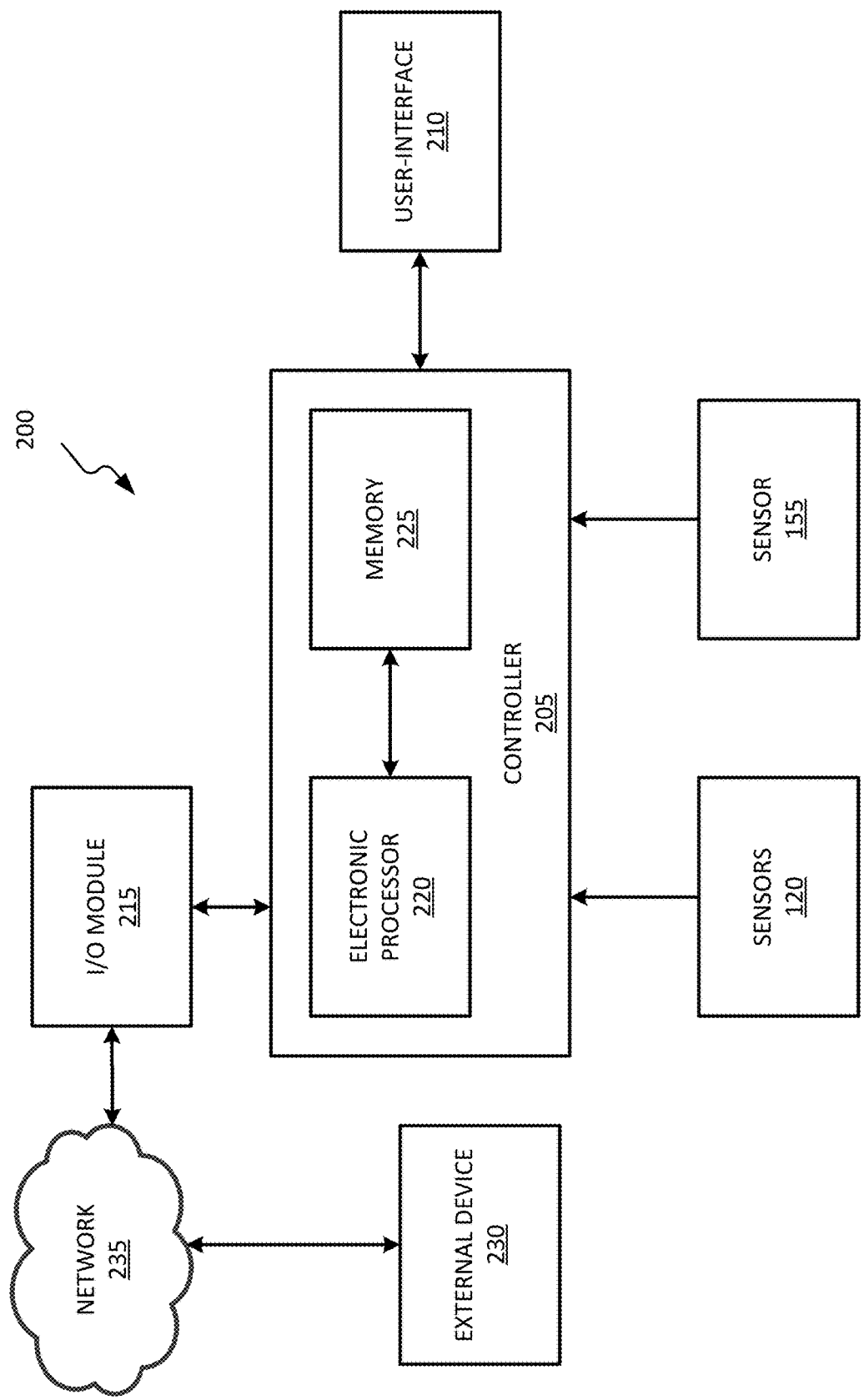
FIG. 5 is a block diagram of a control system of the electrical receptacle of FIG. 1 according to some embodiments.

FIG. 5 is a block diagram illustrating a control system 200. The control system 200 includes a controller 205. The controller 205 is electrically and/or communicatively connected to a variety of modules or components of the receptacle 10. For example, the controller 205 is connected to sensor 155, the additional sensors 120, a user-interface 210, and an input/output (I/O) module 215.

In some embodiments, the controller 205 includes a plurality of electrical and electronic components that provide power, operational control, and protection to the components and modules within the controller 205 and/or the receptacle 10. For example, the controller 205 includes, among other things, an electronic processor 220 (for example, a microprocessor or another suitable programmable device) and the memory 225. In some embodiments, one or more of the components of the controller 205 and control system 200 (in particular one or more of the additional sensors 120 and the user-interface 210) may be integrated in the receptacle 10 or be positioned external to the receptacle 10 (for example, a component may be integrated into a separate electronic device such as the external device 230).

The memory 225 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 220 is communicatively coupled to the memory 225 and executes software instructions that are stored in the memory 225, or stored on another non-transitory computer readable medium such as another memory or a disc. The software may include one or more applications, program data, filters, rules, one or more program modules, and other executable instructions. As explained in more detail below, the electronic processor 220 stores threshold crossing events. The electronic processor 220 may store the type of the threshold (for example, temperature, electrical, and so on), a time of the event, and the particular sensor the signal originated from.

The user-interface 210 is configured to output information concerning the receptacle 10. In some embodiments, the user-interface 210 includes the indicators (for example, LEDs) located in openings 30 and 33. In some embodiments, the user-interface may include additional indicators, such as but not limited to, indicators embedded in the front cover 12. In yet another embodiment, the user-interface 210 may include a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

The I/O module 215 is configured to provide communication between the receptacle 10 an external device 230 (for example, other receptacles, electrical devices, external computers, smart phones, tablets, a server, etc.). In such an embodiment, the receptacle 10 may communicate with the one or more outside devices through a network 235. The network 235 is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In some embodiments, the external device 230 may be the external load electrically coupled to the receptacle 10 to receive electrical power.

The electronic processor 220 is communicatively coupled to the memory 225, sensor 155, the additional sensors 120, a user-interface 210, and the input/output (I/O) module 215. In operation, the controller 205 receives one or more signal from sensors 120 and/or sensor 155. In some embodiments, the one or more signals may correspond to one or more temperatures at various locations of the receptacle 10. The controller 205 compares the one or more signals to one or more thresholds. In some embodiments, the threshold may be determined based on a lookup table, an algorithm, and/or fuzzy logic. For example, in some embodiments the threshold is dynamically calculated based on a characteristic of the external load coupled to the receptacle 10 (for example, based on the electrical load of the external load). Additionally, in some embodiments, the threshold may be user set (for example, via the user-interface 210) and/or determined based on previously-sensed characteristics of the receptacle 10.

If the one or more signals cross the one or more thresholds, the controller 205 outputs an indication. In some embodiments, the indication is output to the user-interface 210. In such an embodiments, the user-interface 210 may change from a first color (for example, green) to a second color (for example, red) when the one or more signals cross the one or more thresholds. In some embodiments, the indication is output to the external device 230. In some embodiments, the one or more signals crossing the one or more thresholds may be indicative of an issue with the receptacle 10. An issue may be, for example, a poor wiring connection, the receptacle 10 being overloaded, and/or a stressed or worn out terminal.

Figure 6:
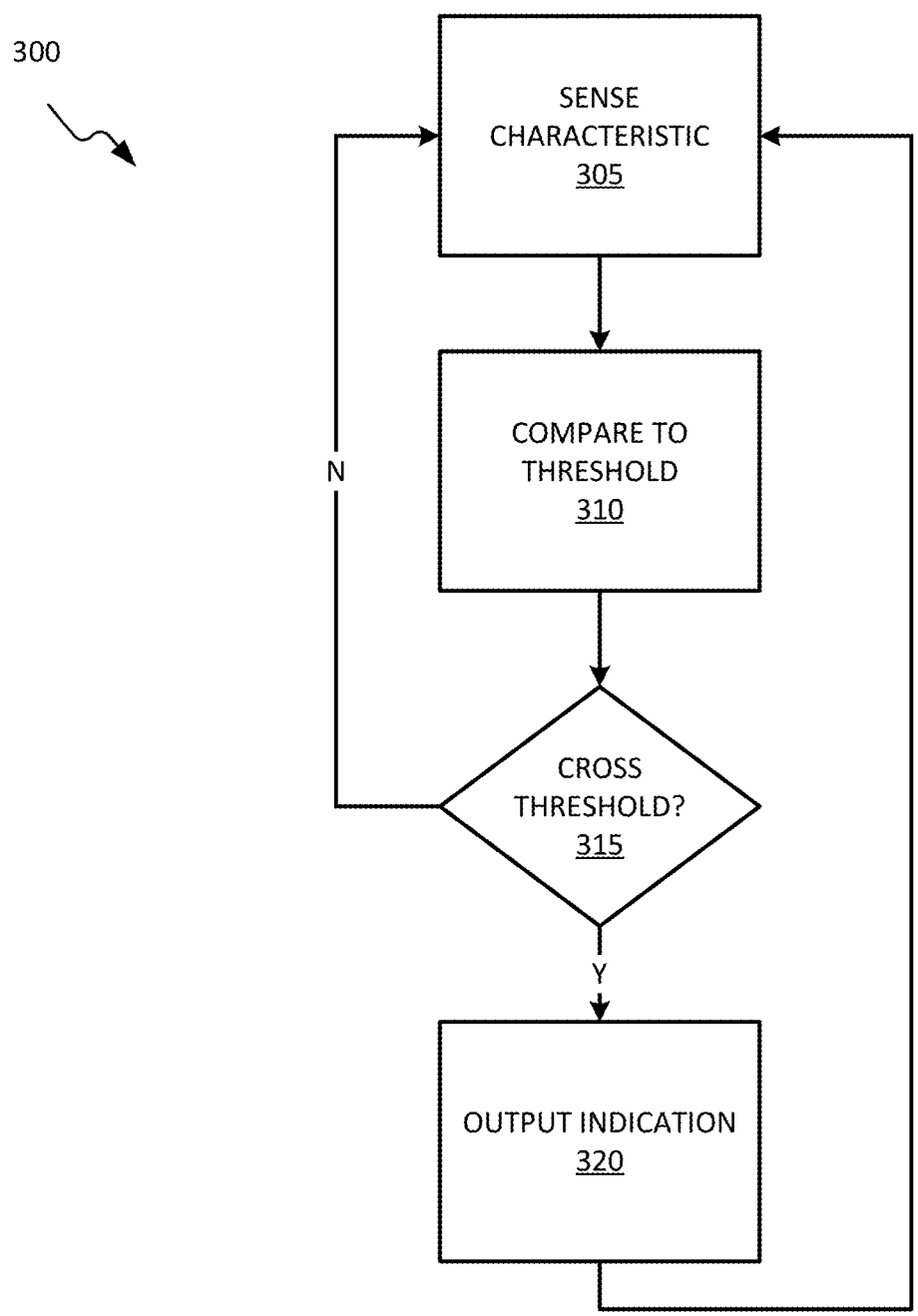
FIG. 6 is a flow chart illustrating an operation of the electrical receptacle of FIG. 1 according to some embodiments.

FIG. 6 is a flow chart illustrating a process, or operation, 300 of the receptacle 10 according to some embodiments. It should be understood that the order of the steps disclosed in process 300 could vary. Additional steps may also be added to the control sequence and not all of the steps may be required. It should also be understood that the process 300 may be performed regardless of whether or not the receptacle 10 is providing power to an external load. Sensors (for example, sensors 120 and/or sensor 155) sense a characteristic (for example, temperature, voltage, current, moisture, etc.) of the receptacle 10 (block 305). The controller 205 receives a signal indicative of the sensed characteristic and compares the signal to a threshold (block 310). The controller 205 determines if the signal has crossed the threshold (block 315). If the signal has not crossed the threshold, process 300 cycles back to block 305.

When the signal has crossed the threshold, the controller 205 outputs an indication (block 320). As discussed above, the indication may be output to the user-interface 210 and/or an external device 230. The process 300 may then cycle back to block 305. In some embodiments, the controller 205 may further be configured to provide a particular indication based on a combination and/or order of threshold crossings of signals from certain sensors 120 and/or sensor 155. For example, a threshold crossing of a voltage threshold and a threshold crossing of a temperature threshold may indicate a failure of an electronic component within the receptacle 10, for example, a relay (not shown). A particular indication may be one or more of a particular color of one or more of the LEDs, a blinking rate of one or more of the LEDs, an alert on the display of the user-interface 210 and/or of an external communication device coupled to the receptacle 10 via the network 235 (for example, external device 230), and the like. In some embodiments, the controller 205 is configured to send a command signal to the external load (when an external load is coupled to the receptacle 10) to stop charging/powering and/or to turn off the external device. In further embodiments, the controller 205 may be configured to discontinue power to the external load. The controller 205 may store threshold crossing events within the memory 225.

Thus, the invention provides, among other things, a system and method for sensing one or more temperature of a receptacle. Various features and advantages of the invention are set forth in the following claims.

In the foregoing specification and accompanying drawings, one or more embodiments are described and illustrated. These embodiments are not limited to the specific details provided herein and may be modified in various ways. Furthermore, other embodiments may exist that are not described herein. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as non-transitory, computer-readable media storing instructions executable by one or more electronic processor to perform the described functionality.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electrical receptacle comprising:
   an outlet configured to electrically connect to an external load;
   a load terminal electrically connected to the outlet;
   a line terminal electrically connected to a line and configured to receive line power;
   a line screw receptacle configured to receive a line screw, the line screw configured to electrically connect the line terminal to the line;
   a sensor configured to sense a temperature of the line screw receptacle; and
   a controller having an electronic processor and a memory, the controller configured to
      receive the temperature of the line screw receptacle,
      compare the temperature to a threshold, and
      output an indication in response to the temperature crossing the threshold;
   wherein the line screw receptable includes a sensor probe that is configured to receive the sensor.

2. The electrical receptacle of claim 1, wherein the electrical receptacle includes one or more additional sensors that are configured to sense at least one selected from the group consisting of a temperature of the load terminal, a temperature of the line terminal, and a temperature of the outlet.

3. The electrical receptacle of claim 1, wherein the temperature of the line screw receptacle is the temperature of the line screw received by the line screw receptacle.

4. The electrical receptacle of claim 1, wherein the indication in response to the temperature crossing the threshold is output to an external device.

5. The electrical receptacle of claim 1, wherein the electrical receptacle further comprises:
   a neutral screw receptacle configured to receive a neutral screw, the neutral screw configured to electrically connect the receptacle to a neutral line.

6. The electrical receptacle of claim 5, wherein the temperature of the neutral screw receptacle is the temperature of the neutral screw received by the neutral screw receptacle.

7. The electrical receptacle of claim 1, further comprising an indicator.

8. The electrical receptacle of claim 7, wherein the indicator is located at a receptacle face.

9. The electrical receptacle of claim 7, wherein the indication in response to the temperature crossing the threshold is output to a user via the indicator.

\* \* \* \* \*